June 20, 1944.  D. W. EXNER ET AL  2,351,945
CIRCUIT CONTROLLING APPARATUS
Filed Nov. 7, 1942
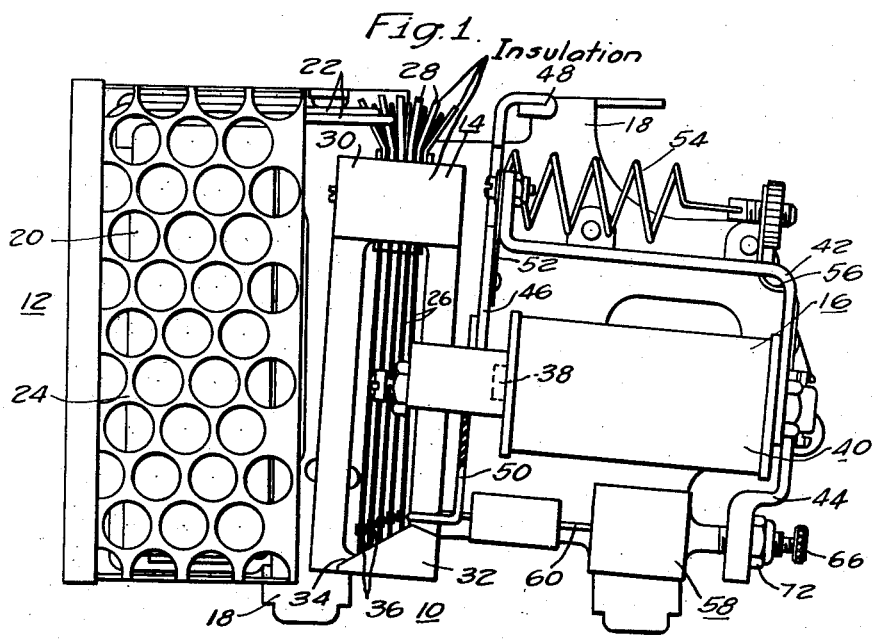
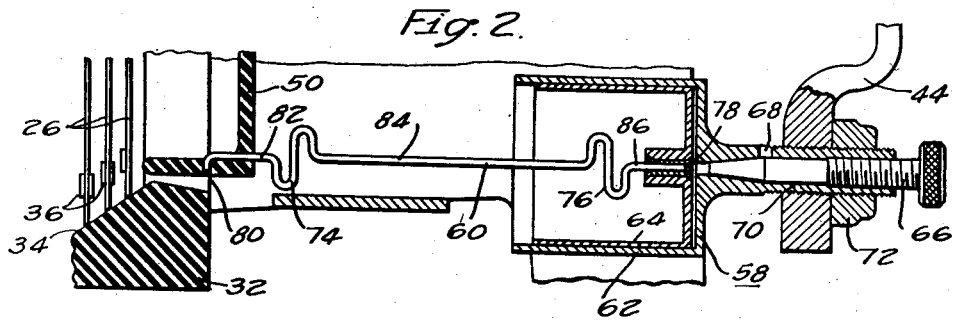
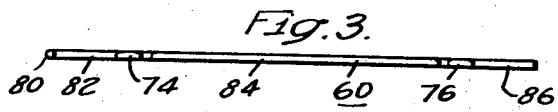
WITNESSES:
INVENTORS
Donald W. Exner and
Omar C. Walley.
BY
ATTORNEY Patented June 20, 1944

2,351,945

UNITED STATES PATENT OFFICE 2,351,945

CIRCUIT CONTROLLING APPARATUS

Donald W. Exner and Omar C. Walley, Lima, Ohio, assignors to Westinghouse Electric & Manufacturing Company, East Pittsburgh, Pa., a corporation of Pennsylvania Application November 7, 1942, Serial No. 464,872

6 Claims. (Cl. 200—97)

This invention relates to electrical apparatus and, in particular, to circuit controlling apparatus.

In equipping aircraft or the like with voltage regulators, it is necessary to maintain the size and weight of the apparatus at a minimum. In meeting these requirements, the effectiveness and efficiency of the apparatus must be maintained. The circuit controlling device of the regulator must be stable in operation over a wide range of temperature and atmospheric changes. This is especially true where the circuit controlling device is to be employed in aircraft which operate at altitudes as high as 40,000 feet above sea level and in which the temperature changes encountered vary over the wide range of —50° C. to +50° C.

Where such circuit controlling apparatus is to be employed in regulating the voltage of an aircraft generator, it is necessary to provide damping in order to prevent sustained oscillations or hunting. However, as such circuit controlling apparatus preferably utilize a plurality of switching members to control the connection of small sections of resistance in the generator field circuit to control the excitation of the generator and since it is difficult to so operate the circuit controlling apparatus that the exact switch member is operated to provide the exact amount of resistance necessary, it is required that the damping means be of such a nature as to prevent sudden large movements for effecting a large number of switching operations while at the same time permitting movements of small amplitude for permitting operation of one or two of the switching members. It is necessary that this movement of small amplitude be permitted in order that the voltage output of the aircraft generator, whose response is quite rapid, be maintained substantially constant.

It is an object of this invention to provide a circuit controlling apparatus having an actuating member so stabilized as to prevent sudden large movements thereof while permitting rapid vibrating movements of small amplitude.

Another object of this invention is to obtain a straight line movement of the piston of a dashpot utilized in damping the pivotal movement of an actuating member in a circuit controlling apparatus.

Other objects of this invention will become apparent from the following description, when taken in connection with the accompanying drawing, in which:

Figure 1 is a view in elevation of the circuit controlling apparatus embodying the teachings of this invention;

Fig. 2 is a view in section and greatly enlarged of a part of the apparatus shown in Fig. 1; and Fig. 3 is a bottom plan view of one of the elements shown in Fig. 2.

Referring to Fig. 1, this invention is illustrated as applied to a circuit controlling device 10 of the general type disclosed in the copending application Serial No. 415,614, filed October 18, 1941, of Ruel C. Jones, which is assigned to the same assignee as this invention. In general, the circuit controlling device 10 comprises a resistor unit 12, a switching apparatus 14 and an electromagnetic device 16 disposed to control the operation of the switching apparatus 14 and all of which is suitably mounted on a supporting base 18.

The resistor unit 12 may be of any suitable type or, as shown, may comprise a resistance element 20 provided with spaced taps (not shown) for securing leads 22 from the switching apparatus 14 and encased in a perforated guard or protective housing 24.

The switching apparatus 14 comprises a plurality of elongated self-biased leaf-spring members 26 having one of their ends insulated from one another by means of layers 28 of suitable insulating material, such as fish-paper or the like, and fixedly supported with respect to each other in an insulating clamping member 30, the details of which are not shown. The other ends of the leaf-spring members 26 are free to move away from an adjustable stop 32, the stop being provided with a beveled or sloped surface 34 for receiving and spacing the ends of the biased members 26 for limiting their movement in the self-biased direction.

Each of the spring leaf members 26 is of good conducting material, such as beryllium-copper alloy or bronze, and carries a contact button 36 near its free end. The contact buttons 36 are so positioned that as the spring leaf members 26 are actuated away from the sloped surface 34 of the stop 32, the contact buttons are progressively actuated into engagement. As illustrated, the projecting ends of the leaf-spring members 26 are connected by the leads 22 to the taps of the resistor unit 20.

The specific details of the switching assembly 14 are more clearly disclosed and described in Patent No. 2,246,301, which issued to C. R. Hanna et al., and which is assigned to the same assignee as this invention.

The electromagnetic device 16 comprises a core member 38 having an energizing winding 40 carried thereon, the winding being disposed to be energized in a predetermined manner from a suitable source of power (not shown). The core 38 also carries an upwardly projecting substantially S-shaped bracket 42 and a downwardly projecting bracket or lug 44 fixedly secured thereto, the purpose of which will be explained more fully hereinafter. The upper end of the bracket 42 is utilized for mounting an elongated armature member 46 in operative relation with respect to the core and coil assembly and the switching assembly 14.

The elongated armature member 46 is provided with a counterweight 48 at its upper end and carries a driving member 50 of insulating material at its lower end disposed to actuate the spring leaf members 26 to effect a progressive switching operation. The armature member 46 is disposed to be pivotally secured to the upper end of the bracket 42 by means of the spring pivot 52 which is preferably of the well known U-shape and is secured to the bracket and armature member in a well known manner. The upper end of the armature member 46 is also secured to one end of a core spring 54, the other end of the spring being adjustably secured to an upwardly extending bimetallic bracket 56 which is secured to the core member. The spring 54 is provided to balance the magnetic pull on the armature member 46 when the winding 40 is energized. Further details of the electromagnetic apparatus 16 and the assembly of the spring leaf members 26 may be had by reference to the copending application Serial 415,614, identified hereinbefore.

In order to stabilize the operation of the armature member 46 and to prevent excessive switching operations of the leaf-spring members 26 as the driving member 50 is pivotally moved, a dashpot 58 is provided. The dashpot 58 is mounted on the bracket 44 and is operatively connected by a fine, relatively stiff wire 60 of spring bronze to the driving member 50 to oppose pivotal movement thereof.

Referring to Fig. 2, the details of the dashpot 58 and the connecting wire 60 are more clearly illustrated. The dashpot 58 comprises a stationary case or cylinder 62 and a plunger or piston 64 movably disposed therein, both members being preferably of stainless steel. The piston 64 makes a very close fit with the inside walls of the cylinder 62, only slight leakage of air being permitted between the side walls of the respective members. The escape of air from the air space between the piston 64 and the cylinder 62 is controlled by means of the adjustable needle valve 66 which cooperates with the port 68 provided in the tubular and threaded stud 70 by which the stationary cylinder 62 is secured to the bracket 44. In practice, a nut 72 is provided for cooperating with the stud 70 for locking the dashpot in position with respect to the bracket 44.

The fine relatively stiff wire 60 has two substantially S-shaped sections 74 and 76 disposed between its ends. Preferably, the curved section 74 is positioned adjacent the driver member 50 while the curved section 76 is positioned adjacent the piston 64 and preferably within the confines thereof. The wire 60 having a diameter in the neighborhood of about .018 of an inch has its one end secured to the piston 64 by soldering it thereto, as illustrated at 78, the other end of the wire projecting through an opening in the side of the driver member 50 and terminating in a hook 80 which is secured to the driver member 50 by projecting it through an opening provided in the base of the driver member.

The wire 60 is preferably connected to the driver member 50 so that when the armature member is actuated to the position where the leaf-spring members 26 are released, the sections 82, 84 and 86 between the driver member 50, curved sections 74 and 76 and the plunger or piston 64, respectively, are straight, concentric and in alignment. As will be apparent the armature member 46 is disposed for pivotal movement in a predetermined plane. Likewise, the curved sections 74 and 76 are disposed to extend in the same plane as the plane of movement of the armature member so that any bending of the wire 60 at the curved sections 74 and 76 is in the same plane as the plane of movement of the armature member to minimize the application of side forces to the piston 64 by the bending moment in the wire 60. The curved sections 74 and 76 thus function as universal joints disposed between the armature member and the piston 64 to translate the angular motion of the armature member to a straight line pull on the piston 64. By reason of the curved section 76, a localized region of compliance is formed which permits the piston 64 to align itself in the cylinder 62 without any accompanying tendency for jamming.

In practice, the control device 10 is disposed with its resistor unit 20 connected in circuit relation with the field winding of the generator (not shown), the voltage of which is to be controlled while the energizing windings 40 of the device 10 are connected to be responsive to the voltage across the generator.

In operation, with the main spring 54 of the control device 10 suitably adjusted for a given set of conditions, the circuit controlling device 10 has its armature member 46 in such a position as to effect the closing of a number of the contact buttons 36 of the switching apparatus 14. If the condition which is to be controlled changes say, for example, the voltage of the circuit to be regulated increases, the winding 40 is so energized as to effect a pivotal movement of the armature member 46 in a counterclockwise direction to effect the progressive release of the spring leaf members 26 to progressively separate the contact buttons 36 thus increasing the number of resistor sections connected in circuit relation with the generator field winding and limiting the rise in voltage.

If, on the other hand, the voltage change of the circuit to be controlled is a decrease in voltage, then the winding 40 is so deenergized that the main spring 54 biases the armature member 46 in a clockwise direction about its spring pivot to effect the progressive closing of the contact buttons 36 carried by the spring leaf members 26, thus decreasing the number of resistor sections connected in circuit relation with the generator field and limiting the decrease in the voltage.

If at any time during the normal operation of the control device 10, a sudden increase or decrease in the voltage is encountered or if the apparatus is subjected to a physical shock, the armature member 46 is so stabilized by the dashpot 58 as to damp out any tendency towards sustained oscillation or hunting. However, the elasticity of the curved sections 74 and 76 of wire 60 permits movements of small amplitude of the armature member under the influence of sudden large changes in voltage to operate one or more of the spring leaf members 26 to initiate a correction without having to overcome the high restraining force of the dashpot.

As the armature member 46 is biased in the clockwise direction by the spring 54 from the position shown in either Figs. 1 or 2 to effect the progressive closing of the contact buttons 36, the sections 82, 84 and 86 of the wire 60 remain substantially straight but are no longer aligned, the pivotal movement of the driver member 50 effecting slight bending of the wire 60 principally in the curved sections 74 and 76. However, during this operation, the straight section 86 of the wire 60 remains substantially unchanged adjacent the piston 64 so that any pull applied to the section 86 effects a straight-line pull on the piston 64. Thus, although the movement of the driver member 50 is a pivotal movement, the curved sections 74 and 76 of the wire 60 are effective for translating the pivotal movement of the driver member 50 to a straight-line pull on the piston 64. This provision for maintaining the straight-line pull on the piston 64 effectively minimizes the application of side pressure between the side walls of the piston 64 and the stationary case 62 of the dashpot.

The circuit controlling apparatus described hereinbefore is very sensitive and functions efficiently when employed for regulating the voltage of a generator. By providing the connection between the dashpot and the armature member as described hereinbefore with a curved section positioned adjacent the driver member and another curved section positioned adjacent the piston of the dashpot an efficient operating mechanism is provided for limiting sudden large movements of the switching apparatus while permitting rapid vibrating movements of small amplitude whereby a close regulation of the voltage of the generator can be obtained.

Although this invention has been described with reference to a particular embodiment thereof, it is of course, not to be limited thereto except insofar as is necessitated by the scope of the appended claims.

We claim as our invention:

1. In a circuit controlling apparatus, in combination, a plurality of contact members disposed to be progressively actuated into and out of engagement, an actuating mechanism for the contact members, the actuating mechanism comprising a core member, an armature member normally biased for pivotal movement in a predetermined direction to effect a progressive switching operation of the contact members, a dashpot having a stationary cylinder and a piston movably disposed therein associated with the armature member, a relatively stiff wire disposed with its ends secured to the piston and the armature member to prevent sudden large movements of the armature member, means disposed between the ends of the wire to render the pull on the piston a straight line pull regardless of the pivotal movement of the armature member, said means also permitting movements of small amplitude of the armature member to effect a limited switching operation of the contact member without effecting a corresponding movement of the piston of the dashpot, and a winding carried by the core member disposed to be energized to effect the pivotal movement of the armature member in a direction opposite to the predetermined normally biased direction.

2. In a circuit controlling apparatus, in combination, a plurality of contact members disposed to be progressively actuated into and out of engagement, an actuating mechanism for the contact members, the actuating mechanism comprising a core member, an armature member normally biased for pivotal movement in a predetermined direction to effect a progressive switching operation of the contact members, a dashpot having a stationary cylinder and a piston movably disposed therein associated with the armature member, a relatively stiff wire disposed with its ends secured to the piston and the armature member to prevent sudden large movements of the armature member, the wire having curved sections disposed to translate the pivotal movement of the armature member to a straight line pull on the piston to prevent side pressure on the cylinder as the piston moves therein, the curved sections also permitting movements of small amplitude of the armature member to effect a limited switching operation of the contact member without effecting a corresponding movement of the piston of the dashpot, and a winding carried by the core member disposed to be energized to effect the pivotal movement of the armature member in a direction opposite to the predetermined normally biased direction.

3. In a circuit controlling apparatus, in combination, a plurality of contact members disposed to be progressively actuated into and out of engagement, an actuating mechanism for the contact members, the actuating mechanism comprising a core member, an armature member normally biased for pivotal movement in a predetermined direction to effect a progressive switching operation of the contact members, a dashpot having a stationary cylinder and a piston movably disposed therein associated with the armature member, a relatively stiff wire disposed with its end secured to the piston and the armature member to prevent sudden large movements of the armature member, the wire having curved sections disposed to translate the pivotal movement of the armature member to a straight line pull on the piston to prevent side pressure on the cylinder as the piston moves therein, one of the curved sections being positioned adjacent the piston, another of the curved sections being positioned adjacent the armature member, the curved sections also permitting movements of small amplitude of the armature member to effect a limited switching operation of the contact member without effecting a corresponding movement of the piston of the dashpot, and a winding carried by the core member disposed to be energized to effect the pivotal movement of the armature member in a direction opposite to the predetermined normally biased direction.

4. In a circuit controlling apparatus, in combination, a plurality of contact members disposed to be progressively actuated into and out of engagement, an actuating mechanism for the contact members, the actuating mechanism comprising a core member, an armature member normally biased for pivotal movement in a predetermined direction to effect a progressive switching operation of the contact members, a dashpot having a stationary cylinder and a piston movably disposed therein associated with the armature member, a relatively stiff wire disposed with its ends secured to the piston and the armature member to prevent sudden large movements of the armature member, the wire having two substantially S-shaped curve sections disposed between its ends for translating the pivotal movement of the armature member to a straight line pull on the piston to prevent side pressure on the cylinder as the piston moves therein, one of the S-shaped curve sections being positioned adjacent the piston, the other S-shaped curve section being positioned adjacent the armature member, the curved sections also permitting movements of small amplitude of the armature member to effect a limited switching operation of the contact member without effecting a corresponding movement of the piston of the dashpot, and a winding carried by the core member disposed to be energized to effect the pivotal movement of the armature member in a direction opposite to the predetermined normally biased direction.

5. In a circuit controlling apparatus, in combination, a plurality of contact members disposed to be progressively actuated into and out of engagement, an actuating mechanism for the contact members, the actuating mechanism comprising, a core member, an elongated armature member disposed for pivotal movement in a predetermined plane, means for normally biasing the armature member in a predetermined direction to effect a progressive switching operation of the contact members, a dashpot having a stationary cylinder and a piston movably disposed therein associated with the armature member, a relatively stiff wire disposed with its ends secured to the piston and the armature member to prevent sudden large movements of the armature member, the wire having two substantially S-shaped curve sections disposed between its ends for translating the pivotal movement of the armature member to a straight line pull on the piston to prevent side pressure on the cylinder as the piston is moved therein, each of the S-shaped curve sections being disposed to extend in the same plane as the predetermined plane of movement of the armature member, one of the S-shaped curve sections being positioned adjacent the piston, the other S-shaped curve section being positioned adjacent the armature member, the curved sections also permitting movements of small amplitude of the armature member to effect a limited switching operation of the contact member without effecting a corresponding movement of the piston of the dashpot, and a winding applied to the core member disposed to be energized to effect the pivotal movement of the armature member in a direction opposite to the predetermined normally biased direction.

6. In a circuit controlling apparatus, in combination, a plurality of spring biased switches, a spring biased armature member disposed for pivotal movement for progressively actuating the spring biased switches to closed positions, an electromagnetic means for actuating the armature member to effect the progressive release of the spring biased switches, a dashpot having a stationary cylinder and a piston movably disposed therein carried by the electromagnetic means, and an elongated wire member disposed to connect the armature member and the piston of the dashpot to prevent sudden large movements of the armature member, the wire having curved sections disposed to translate the pivotal movement of the armature member to a straight line pull on the piston to prevent side pressure on the case as the piston moves therein, one of the curved sections being positioned adjacent the armature member, another of the curved sections being positioned adjacent the piston, the curved sections having predetermined spring characteristics for permitting movements of small amplitude of the armature member to effect a limited actuation of the spring biased switches without effecting a corresponding movement of the piston.

DONALD W. EXNER.
OMAR C. WALLEY.